(12) United States Patent
Martin et al.

(10) Patent No.: US 10,870,778 B2
(45) Date of Patent: Dec. 22, 2020

(54) ELASTOMERIC TAPE WITH ENHANCED STRETCH CHARACTERISTICS

(71) Applicant: NIKE, Inc., Beaverton, OR (US)

(72) Inventors: Lindsey V. J. Martin, Portland, OR (US); Andrew Gosse, West Linn, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/106,735

(22) Filed: Aug. 21, 2018

(65) Prior Publication Data

US 2018/0355217 A1 Dec. 13, 2018

Related U.S. Application Data

(62) Division of application No. 14/755,339, filed on Jun. 30, 2015, now abandoned.

(51) Int. Cl.
| | |
|---|---|
| *A41D 27/24* | (2006.01) |
| *C09J 7/20* | (2018.01) |
| *B32B 7/12* | (2006.01) |
| *B26D 3/10* | (2006.01) |
| *B29C 65/74* | (2006.01) |

(Continued)

(52) U.S. Cl.
CPC ............ *C09J 7/203* (2018.01); *A41D 27/24* (2013.01); *B26D 3/10* (2013.01); *B29C 65/74* (2013.01); *B32B 7/12* (2013.01); *C09J 7/20* (2018.01); *A41D 2300/50* (2013.01); *B32B 3/28* (2013.01); *B32B 5/26* (2013.01); *B32B 2437/00* (2013.01); *C09J 2301/16* (2020.08)

(58) Field of Classification Search
CPC .... C09J 7/02; C09J 2203/30; C09J 2203/334; A41D 27/24; A41D 2300/50; A41D 27/245; A41D 2300/52; D04D 9/00; Y10T 428/24008; Y10T 428/24628; Y10T 428/24669
USPC ........... 428/99, 174, 179, 192, 202; 2/243.1, 2/227, 275, 79
See application file for complete search history.

(56) References Cited

U.S. PATENT DOCUMENTS

| | | |
|---|---|---|
| 1,295,720 A | 2/1919 | Evans |
| 2,060,906 A | 11/1936 | Snyder |

(Continued)

FOREIGN PATENT DOCUMENTS

| | | |
|---|---|---|
| CA | 2659986 A1 | 1/2008 |
| CN | 2701884 Y | 5/2005 |

(Continued)

OTHER PUBLICATIONS

Communication pursuant to Article 94(3) dated Dec. 7, 2018 in European Patent Application No. 16741735.1, 7 pages.

(Continued)

*Primary Examiner* — Megha M Gaitonde
(74) *Attorney, Agent, or Firm* — Shook, Hardy and Bacon LLP (57) ABSTRACT

An elastomeric tape having a shape configuration that provides an enhanced longitudinal stretch characteristic is provided herein. The exemplary tape comprises a first surface, a second surface opposite the first surface, a first side and a second side opposite the first side where the first side comprises a series of alternating peaks and troughs and the second side comprises a series of alternating peaks and troughs.

9 Claims, 9 Drawing Sheets

(51) Int. Cl.
   *B32B 3/28*  (2006.01)
   *B32B 5/26*  (2006.01)

(56) References Cited

U.S. PATENT DOCUMENTS

| | | | |
|---|---|---|---|
| 2,526,156 A | | 10/1950 | Quale |
| 2,860,081 A | | 11/1958 | Eiken |
| 3,853,595 A | | 12/1974 | Pedginski et al. |
| 3,947,896 A | | 4/1976 | Taylor |
| 4,198,916 A | * | 4/1980 | dePolo ............... A41D 1/007 112/470.17 |
| 4,310,373 A | | 1/1982 | Schuhmacher et al. |
| 4,410,575 A | | 10/1983 | Obayashi et al. |
| 4,753,182 A | * | 6/1988 | Blackburn ............ A41D 27/24 112/419 |
| 4,919,743 A | | 4/1990 | Johnston et al. |
| 5,198,300 A | | 3/1993 | Matthews et al. |
| 5,802,612 A | | 9/1998 | Hosking |
| 6,060,408 A | | 5/2000 | Monica |
| 6,110,565 A | | 8/2000 | Matthews |
| 6,187,131 B1 | | 2/2001 | Wenzel |
| 6,645,338 B1 | | 11/2003 | Sangani et al. |
| 6,807,685 B1 | | 10/2004 | Hasegawa et al. |
| 7,005,021 B2 | | 2/2006 | Kramer |
| 7,087,539 B2 | | 8/2006 | Carbonare |
| 7,141,767 B2 | | 11/2006 | Holzer et al. |
| 8,153,221 B1 | | 4/2012 | MacKinnon |
| 8,153,224 B2 | | 4/2012 | Pellegrini |
| 8,518,511 B2 | | 8/2013 | Harward |
| 2004/0258904 A1 | | 12/2004 | Uemoto |
| 2006/0165939 A1 | | 7/2006 | Hottner |
| 2012/0227164 A1 | * | 9/2012 | Komoriya ............... B32B 5/26 2/400 |
| 2012/0301660 A1 | | 11/2012 | Bartusiak |
| 2014/0150962 A1 | | 6/2014 | Rule et al. |
| 2014/0223648 A1 | | 8/2014 | Munter |
| 2016/0198835 A1 | | 7/2016 | Iwagaki et al. |

FOREIGN PATENT DOCUMENTS

| | | | |
|---|---|---|---|
| CN | 201648634 U | | 11/2010 |
| CN | 201648697 U | | 11/2010 |
| DE | 3123436 A1 | | 12/1982 |
| DE | 3724528 A1 | | 2/1989 |
| DE | 29901090 U1 | | 5/1999 |
| DE | 20200424 U1 | | 6/2003 |
| DE | 20200424 | * | 7/2003 |
| DE | 102010054802 A1 | | 6/2012 |
| EP | 2197303 B1 | | 2/2012 |
| GB | 2443902 B | | 11/2008 |
| JP | 2012007045 A | | 1/2012 |

OTHER PUBLICATIONS

International Search Report and Written Opinion dated Oct. 18, 2016 for International Patent Application No. PCT/US2016/039833, 13 pages.
Final Office Action dated May 23, 2018 in U.S. Appl. No. 14/755,339, 8 pages.
International Preliminary Report on Patentability dated Jan. 11, 2018 in International Patent Application No. PCT/US2016/039833, 9 pages.
"Ricrac Elastic Tape, Elastic Rickrack Trim Ribbon," Alibaba.com, Item #:124971. http://www.alibaba.com/product-detail/Ricrac-Elastic-Tape-Elastic-Rickrack-Trim_451664161.html.
Communication pursuant to Article 94(3) EPC dated Apr. 18, 2019 in European Patent Application No. 16741735.1, 4 pages.
Communication pursuant to Article 94(3) dated Nov. 12, 2019 in European Patent Application No. 16741735.1, 5 pages.
Office Action received for European Patent Application No. 16741735.1, dated May 11, 2020, 5 pages.

* cited by examiner

ELASTOMERIC TAPE WITH ENHANCED STRETCH CHARACTERISTICS

CROSS-REFERENCE TO RELATED APPLICATIONS

This application, having U.S. application Ser. No. 16/106,735, filed Aug. 21, 2018, and entitled "Elastomeric Tape with Enhanced Stretch Characteristics," is a divisional application of U.S. application Ser. No. 14/755,339, entitled "Elastomeric Tape with Enhanced Stretch Characteristics," filed Jun. 30, 2015, and now abandoned. The entirety of the aforementioned application is incorporated by reference herein.

FIELD

The present disclosure relates to an elastomeric tape used, for example, to reinforce and/or bond seams or hems of an article, where the elastomeric tape has a shape configuration that imparts an enhanced stretch characteristic to the tape and to the seams once affixed.

BACKGROUND

Traditional elastomeric tapes used, for example, to affix seams or hems of an article and/or to reinforce an already-affixed seam or hem generally have a shape configuration comprising a top surface, a bottom surface, a first side, and a second side opposite the first side where the first and second sides are linear and are in parallel alignment with each other. Although these types of tapes may exhibit some degree of stretch along their longitudinal axes due to their material composition, the degree of stretch is typically limited. Because of the limited longitudinal stretch characteristics of traditional tapes, the seams on which the tapes are used generally exhibit low stretch characteristics. For seams located on, for example, an article of apparel, this may result in wearer discomfort when the wearer moves or is donning or doffing the apparel item. Moreover, when a tension force is applied to the seam of the article that exceeds the limited degree of stretch of the tape, the tape may break and/or become unaffixed from the seam with a resultant loss in seam integrity.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

At a high level, aspects herein are directed towards an exemplary elastomeric tape having an enhanced stretch characteristic along a longitudinal axis of the tape in response to a stretch force. The enhanced stretch characteristic is due to the shape configuration of the tape as well as the inherent stretch characteristics of the material used to form the tape. In general, the tape comprises a first surface and a second surface opposite the first surface. Continuing, the tape has a first side having a shape configuration comprising a first series of alternating peaks and troughs, and a second side opposite the first side where the second side has a second series of alternating peaks and troughs. To impart the enhanced stretch characteristic, the tape may be configured such that a peak on the first side is aligned across the width of the tape with a trough on the second side, and a trough on the first side is aligned across the width of the tape with a peak on the second side.

Continuing, by having the shape configuration as described, the exemplary elastomeric tape may longitudinally stretch to a greater degree in response to a stretch force as compared to elastomeric tapes having linear sides in parallel alignment. This is because the shape configuration described herein provides a longer linear distance that "rotates" or translates into the axis of stretch to provide additional length to the tape. Thus, when the elastomeric tape described herein is used to bond and/or reinforce an article seam or an article hem, the seam or hem is able to undergo a greater degree of stretch along its longitudinal axis while still maintaining the integrity of the tape. This not only improves the useability of the article but also allows seam and/or hem integrity to be maintained under higher degrees of mechanical stretch as compared to seams or hems bonded or reinforced with traditional seam tapes. Moreover, when the article is in the form of an apparel item, wearer comfort is improved due to the greater degree of stretch at the seams and/or hems.

Aspects herein further relate to a method of manufacturing an elastomeric tape having enhanced stretch characteristic. The method may comprise providing an elastomeric tape having a first surface, a second surface opposite the first surface, a first side, and a second side opposite the first side where the first side and the second side are linear and are in parallel alignment with each other. The elastomeric tape is then cut using, for example, a die cutter having two complementary die cutting wheels such that the first side has a shape configuration comprising a first series of alternating peaks and troughs and the second side has a shape configuration comprising a second series of alternating peaks and troughs. In an exemplary aspect, the tape may be cut such that a peak on the first side of the tape is aligned across the width of the tape with a trough on the second side of the tape, and a trough on the first side of the tape is aligned across the width of the tape with a peak on the second side.

The method may further comprise, for instance, rolling the cut tape onto a roller, using the roller to apply the cut elastomeric tape to one or more hems or seams of an article and activating the tape such that it is adhered to the one or more hems or seams. The activation of the tape may be through a heat process, a chemical process, light, ultrasound, mechanical pressure, and the like.

Aspects may also relate to an article having an elastomeric tape that provides enhanced stretch characteristic at one or more seams and/or hems of the article. The article may be in the form of, for instance, an article of apparel for an upper or a lower torso of a wearer, a backpack, a duffel bag, a purse, a shoe, and the like. With respect to seams, the article may comprise at least a first panel of material and a second panel of material where the second panel abuts the first panel at one or seams. In exemplary aspects, the seams and/or hems may be straight, curved, or irregular. In exemplary aspects the article may further comprise the elastomeric tape having the shape configuration described herein.

BRIEF DESCRIPTION OF THE DRAWINGS

Examples of the present invention are described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Aspects herein relate to an exemplary elastomeric tape having a defined shape configuration that provides for an enhanced stretch characteristic along the longitudinal axis of the tape in response to a stretch force. More specifically, the exemplary elastomeric tape comprises a first surface and a second surface opposite the first surface. In aspects, the second surface may have an adhesive that is activated by, for instance, heat, light, mechanical pressure, ultrasound, and the like. Continuing, the elastomeric tape may further comprise a first side and a second side opposite the first side. Each side of the tape may have a shape configuration comprising a series of alternating peaks and troughs. As used throughout this disclosure, a "peak" may be defined as a shape having a general apex region that is located a first distance away from an axis longitudinally bisecting the tape, and an "trough" may be defined as a shape having a general apex region that is located a second distance away from the axis longitudinally bisecting the tape, where the second distance is less than the first distance. Further, an "apex region" may be defined as the region of the peak shape and the trough shape that is furthest away or closest to the longitudinal axis respectively. The apex region may comprise a defined point or a more general region in exemplary aspects.

In an exemplary configuration, a trough on the first side may be aligned across the width of the tape with a peak on the second side, and a peak on the first side may be aligned across the width of the tape with a trough on the second side. This shape configuration combined with the inherent elasticity due to the material composition of the elastomeric tape, allows the tape to be stretched to a greater length in response to a longitudinal stretch force as compared to traditional tapes where the sides are linear and in parallel alignment with each other. One reason for this is that the shape configuration as described provides a longer linear distance that rotates or translates into the axis of stretch to help provide additional length.

The exemplary tape described herein may have a number of different thicknesses as well as a number of different widths as measured from a peak on the first side to a peak on the second side. As well, the tape may have a number of different tolerances as measured from a trough on the first side to a trough on the second side. In addition, it is contemplated herein that there may be a number of different distances between adjacent peaks on each side of the tape and between adjacent troughs on each side of the tape. It is further contemplated herein that there may be a number of different angles formed between adjacent troughs.

The peaks and troughs described above, moreover, may have a number of different configurations. In one example, each peak and each trough may terminate at a defined apex point, while in another example, the peaks and troughs may be more rounded and even assume an undulating or sinusoidal characteristic. In yet another exemplary aspect, different geometric shapes such as, for examples, circles, stars, triangles, squares, and the like, may be associated with the peaks to provide a pleasing aesthetic appearance to the tape while still providing an enhanced stretch characteristic. Any and all such aspects, and any variation thereof, are contemplated as being within the scope herein.

The exemplary elastomeric tape described herein may be formed from a traditional tape having sides in linear alignment by cutting the tape to form the peaks and troughs having the shape configurations described. Once cut, the exemplary elastomeric tape may be used to bond and/or to reinforce seams and/or hems of an article.

As used throughout this disclosure, the term "elastomeric tape" may comprise a thermoplastic polyurethane (TPU) tape, a polyurethane (PU) tape, a silicone tape, a rubber tape, and the like. An exemplary TPU tape may be manufactured by Bemis Associates Inc. located in Shirley, Mass. The materials used to form the tape may have an inherent modulus of elasticity. The tape may be colored or uncolored and may have varying thicknesses. Further, in exemplary aspects, the tape may have an adhesive on one of its surfaces that is used to adhere or bond the tape to, for example, a seam or hem of an article using light, ultrasound, heat, a chemical process, mechanical pressure, and the like. In other exemplary aspects, the tape may not have an adhesive on one of its surfaces and, instead, may be directly bonded to the seam or hem using the same processes noted above. Any and all such aspects, and any variation thereof, are contemplated as being within the scope herein.

Figure 1A:
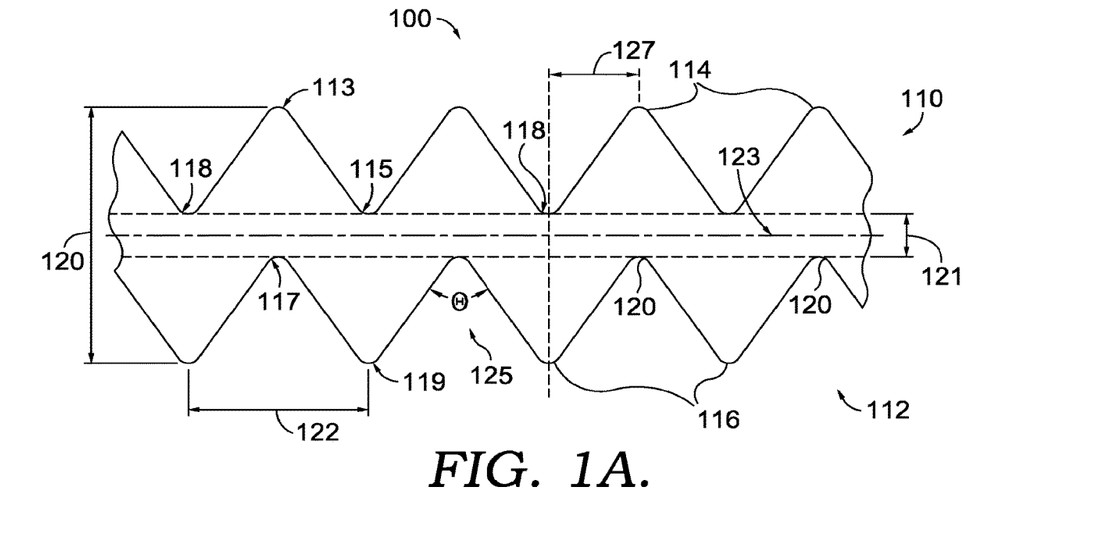
FIG. 1A illustrates a plan view of an exemplary configuration for an exemplary elastomeric tape in a non-stretched state in accordance with an aspect herein.
Figure 1B:
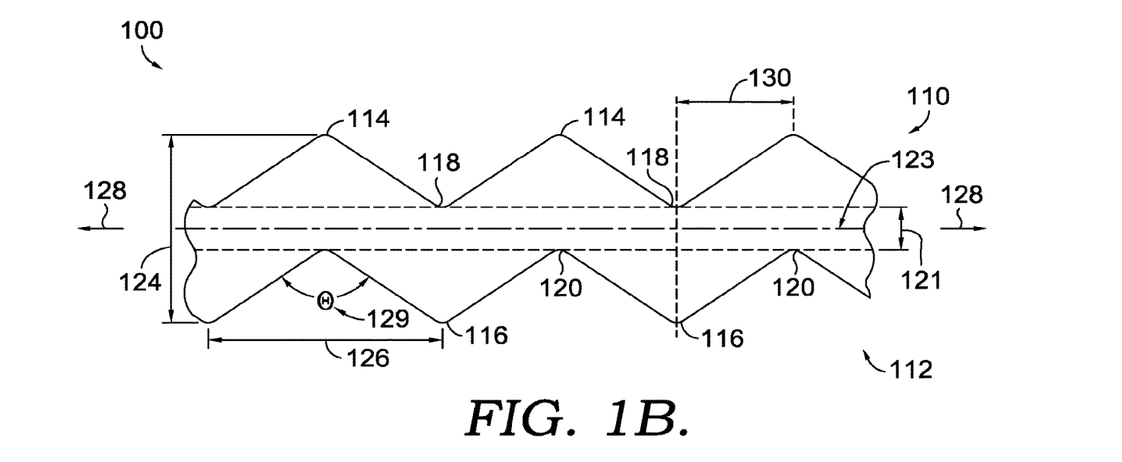
FIG. 1B illustrates a plan view of the exemplary configuration for the exemplary elastomeric tape of FIG. 1A in a stretched state in accordance with an aspect herein.

An exemplary elastomeric tape, referenced generally by the numeral 100, is shown in FIGS. 1A and 1B in accordance with aspects herein. The exemplary tape 100 has a shape configuration that provides an enhanced stretch characteristic to the tape 100 in response to a stretch force in accordance with aspects herein. Accordingly, the tape 100 shown in FIG. 1A is in a resting, or non-stretched state. The tape 100 comprises a first side 110 and a second side 112 opposite the first side 110. The tape 100 further comprises a first surface and a second surface as will be shown and discussed in relation to FIG. 2. In the exemplary configuration shown in FIG. 1A, the first side 110 comprises a series of alternating peaks referenced generally by the numeral 114 and troughs referenced generally by the numeral 118, and the second side 112 comprises a series of alternating peaks referenced generally by the numeral 116 and troughs referenced generally by the numeral 120. The apex region of the peaks 114, 116 and the troughs 118, 120 may be pointed (e.g., terminate at an actual point) or may be more rounded as shown in FIG. 1A. FIGS. 10-16 illustrate examples of other exemplary configurations of peaks and troughs; these figures will be discussed in greater detail below.

In the exemplary configuration shown in FIG. 1A, a trough 120 on the second side 112 is aligned across the width of the tape 100 with a peak 114 on the first side 110. For instance, trough 117 is aligned across the width of the tape with peak 113. Similarly, a trough 118 on the first side 110 is aligned across the width of the tape 100 with a peak 116 on the second side 112. For instance, trough 115 is aligned across the width of the tape 100 with peak 119. This configuration may be particularly suited for applications to straight or non-curved seams as well as curved or irregular seams. Reference numeral 123 indicates a hypothetical longitudinal axis that bisects the tape 100 and runs the length of the tape 100.

As shown in FIG. 1A, the tape 100 in its non-stretched state has a width 120, where the width 120 is measured from an apex of a peak 114 on the first side 110 to an apex of a peak 116 on the second side 112. Exemplary widths 120 may comprise, for instance, 10 millimeters (mm), 15 mm, 18 mm, 20 mm, 27 mm, or 30 mm. It is contemplated, however, that the exemplary tape 100 may have a width 120 less than 10 mm, greater than 30 mm, and/or have a width 120 at any value between 10 mm and 30 mm.

As also shown in FIG. 1A, the tape 100 in its non-stretched state has a tolerance 121, where the tolerance 121 is measured from an apex of a trough 118 on the first side 110 to an apex of a trough 120 on the second side 112. Exemplary tolerances 121 may comprise, for example, 3 mm, 5 mm, 5.5 mm, or 8 mm. It is contemplated, however, that the exemplary tape 100 may have a tolerance 121 less than 3 mm, greater than 8 mm, and/or have a tolerance 121 at any value between 3 mm and 8 mm.

Continuing, the tape 100 in its non-stretched state has a distance 122 between the apexes of adjacent peaks 114 and between the apexes of adjacent peaks 116 that may comprise, for example, 4 mm, 6 mm, 8 mm, 10 mm, 12 mm, or 14 mm. It is contemplated, however, that the distance 122 may be less than 4 mm, greater than 14 mm, and/or have a distance 122 at any value between 4 mm and 14 mm. By extension, the distance between the apexes of adjacent troughs 118 and between the apexes of adjacent troughs 120 may be the same as the distance 122. Moreover, it is contemplated herein that distance 122 between the adjacent peaks 114 and the adjacent troughs 118 on the first side 110 is the same as the distance 122 between the adjacent peaks 116 and the adjacent troughs 120 on the second side 112. Reference numeral 127 indicates a peak offset distance between a peak 114 on the first side 110 and a peak 116 on the second side 112 of the tape 100. In exemplary aspects, the peak offset distance 127 may be approximately half of the distance 122 between adjacent peaks on the same side of the tape 100.

Still further, the tape 100 in its non-stretched state may have a trough angle 125 that may comprise 30 degrees, 40 degrees, 45 degrees, 50 degrees, 60 degrees, or the like. The trough angle may be defined as the angle taken at the apex region of a trough. The angle 125 is the same between the troughs 118 and the troughs 120 in exemplary aspects. It is contemplated herein that the angle 125 may be less than 30 degrees, greater than 60 degrees, and/or any value between 30 degrees and 60 degrees.

FIG. 1B illustrates the tape 100 when a stretch force 128 is applied to the tape 100 along its longitudinal axis 123 (shown by the arrows). When the stretch force 128 is applied to the tape 100, the apexes of the peaks 114 and 116 are drawn toward the longitudinal axis 123 thereby decreasing the width 120 of the tape 100 to a new width 124 less than the width 120. Continuing, the stretch force 128 further causes the distance 122 between adjacent peaks to increase to a new distance 126 greater than the distance 122. Moreover, in response to the stretch force 128, the trough angle 125 for both sides of the tape 100 may increase to a new trough angle 129 that is greater than the trough angle 125. Still further, the peak offset distance 127 increases to a new peak offset distance 130 that is greater than the peak offset distance 127. The result of these actions is a reversible increase in the linear length of the tape 100. As long as the stretch force 128 does not exceed the modulus of elasticity of the tape 100, the tape 100 will return to its resting state as shown in FIG. 1A once the stretch force 128 is removed. The configuration thus described makes the tape 100 particularly useful for bonding and/or reinforcing seams and/or hems for which a degree of stretch is desired.

Figure 2:
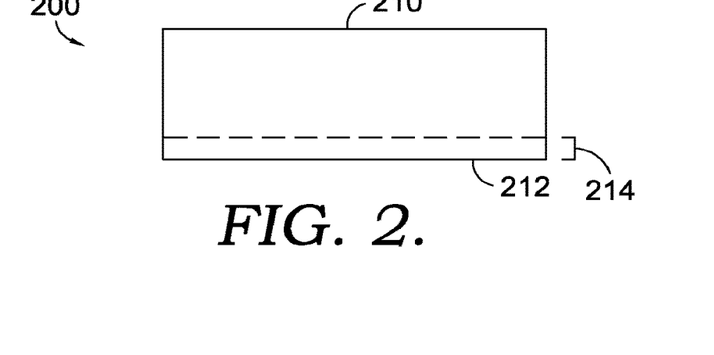
FIG. 2 illustrates a side view of an exemplary elastomeric tape in accordance with an aspect herein.

Turning now to FIG. 2, a side view of an exemplary tape 200 is illustrated in accordance with aspects herein. The tape 200 may comprise the tape 100 in exemplary aspects. The tape 200 comprises a first surface 210 and a second surface 212. In exemplary aspects, the tape 200 may have a number of different thickness between, for instance 25 mircrometers up to 0.40 mm. In exemplary aspects, an adhesive layer 214 may be applied to the second surface 212. The adhesive layer 214, in turn, may be used to bond or affix the second surface 212 of the tape 200 to an article seam or an article hem. In exemplary aspects, the adhesive layer 214 may be activated via the application of light, ultrasound, heat, pressure, or via a chemical process. Although shown with the adhesive layer 214, it is contemplated herein, that the tape 200 may not have an adhesive layer and, instead, may be directly affixed to, for example, a seam or a hem. Any and all such aspects, and any variation thereof, are contemplated as being within the scope herein.

Figure 3:
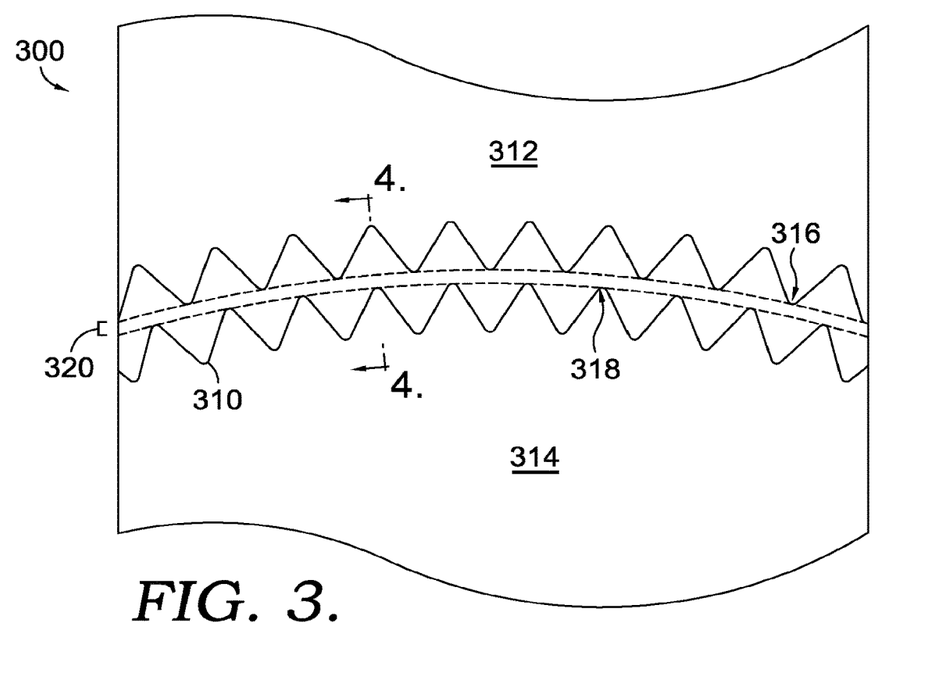
FIG. 3 illustrates an exemplary elastomeric tape bonding and/or reinforcing a seam in accordance with an aspect herein.

FIG. 3 is a top view of an exemplary tape 310 used to bond and/or reinforce a seam of an article 300 in accordance with aspects herein. The exemplary tape 310 may comprise the tape 300. As shown in FIG. 3, the article 300 comprises at least a first panel of material 312 (only a portion of which is shown), and a second panel of material 314 (only a portion of which is shown). A seam 320 (shown in relief) is formed where the edge 316 of the first panel 312 abuts the edge 318 of the second panel 314. With respect to FIG. 3, the seam 320 is shown as curved although it is contemplated herein that the seam 320 may be straight or irregular.

The tape 310 is shown overlying the seam 320. The tape 310 has an exemplary configuration similar to that shown in FIGS. 1A and 1B where a trough on the first side is aligned across the width of the tape 310 with a peak on the second side, and a peak on the first side is aligned across the width of the tape 310 with a trough on the second side. The tape 310 may be adhered to the panels 312 and 314 via an adhesive layer such as the adhesive layer 214 of FIG. 2. Alternatively, the tape 310 may be directly adhered or affixed to the panels 312 and 314 without use of an adhesive layer. For instance, the tape 310 may be heat pressed to a temperature that causes the tape 310 to partially melt and adhere to the panels 312 and 314. Any and all aspects, and any variation thereof, are contemplated as being within the scope herein.

Figure 4:
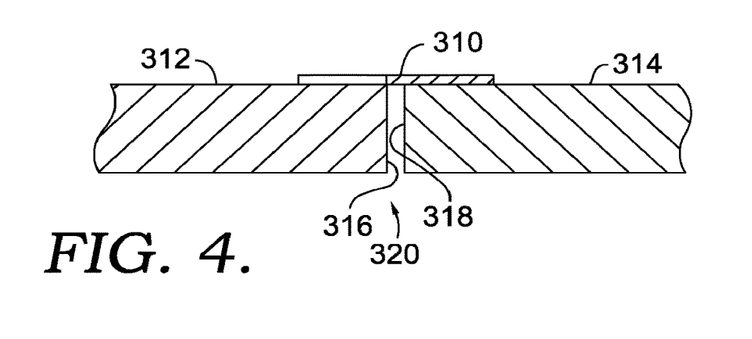
FIG. 4 illustrates cross-section taken along line 4-4 of FIG. 3 in accordance with an aspect herein.

FIG. 4 is a cross-section view taken at the seam 320. As shown, the seam 320 represents the junction of the edge 316 of the first panel 312 with the edge 318 of the second panel 314. The exemplary elastomeric tape 310 overlies the seam 320. More specifically, a surface of the tape 310 overlies the seam 320 and may be affixed to the seam 320 via an adhesive layer such as the adhesive layer 214 of FIG. 3. Although shown as having a gap or space between the edges 316 and 318, in exemplary aspects, the edges 316 and 318 may directly touch one another, and/or one of the edges 316 or 318 may overlap the other edge 316 or 318. For instance, the edges 316 and 318 may be directly affixed to each other using ultrasonic welding. Further, in exemplary aspects, the seam 320 may be secured and or affixed using affixing technologies such as stitching or adhesives. In this instance, the tape 310 may act to reinforce the already-affixed seam 320. In other exemplary aspects, the edges 316 and 318 may only be secured and/or affixed via the tape 310. Any and all such aspects, and any variation thereof, are contemplated as being within the scope herein.

Figure 5A:
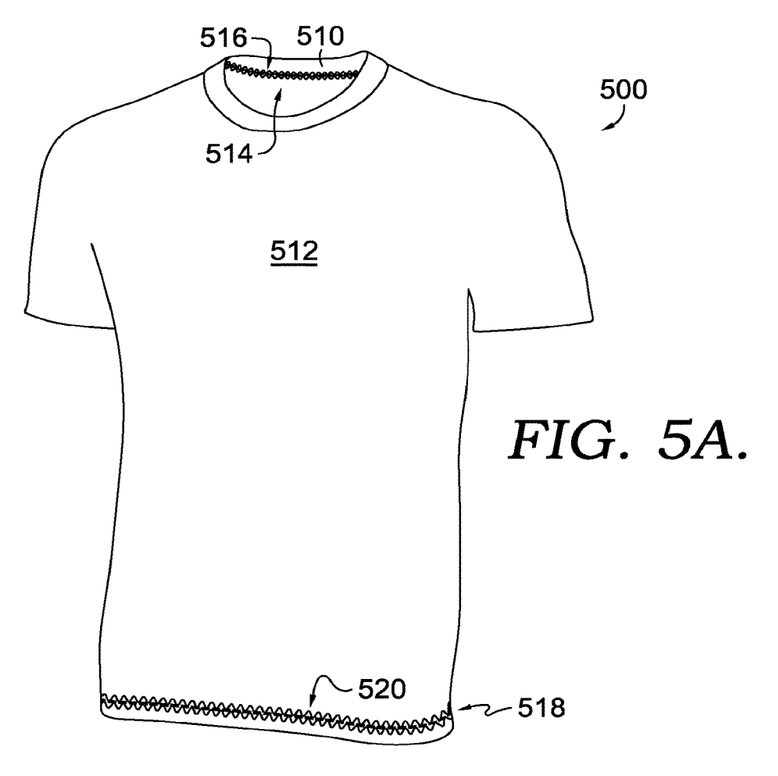
FIG. 5A illustrates an exemplary article of apparel for an upper torso of a wearer having a seam and/or a hem bonded and/or reinforced with an exemplary elastomeric tape in accordance with an aspect herein.

Examples of seams and/or hems located on articles and secured using the exemplary elastomeric tape described herein are shown in FIGS. 5A-7. FIG. 5A illustrates an article of apparel 500 for an upper torso of a wearer, where the article of apparel 500 comprises at least a collar portion 510 affixed to a body portion 512 at a seam 514, where the seam 514 is curved. The seam 514 is bonded and/or reinforced by an elastomeric tape 516 having an exemplary configuration as described herein such as the exemplary configuration of the tape 100. The article 500 further includes a hem 518 at its bottom margin. The hem 518 is bonded and/or reinforced by an elastomeric tape 520 having an exemplary configuration as described herein such as the exemplary configuration of the tape 100. Although shown on the external-facing surface of the article 500 for aesthetic appeal, it is contemplated herein that the hem 518 may face inward and the tape 520 may be located on an inner-facing surface of the article of apparel 500.

Figure 5B:
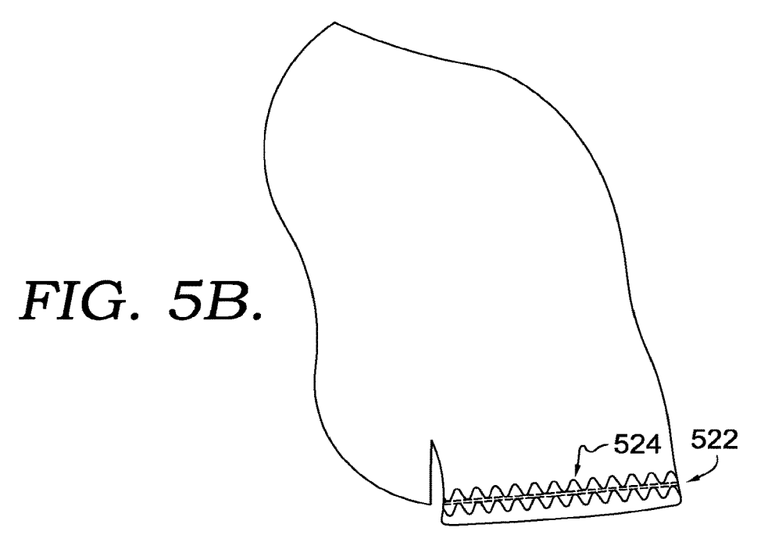
FIG. 5B illustrates an exemplary sleeve of the article of apparel of FIG. 5A having a hem bonded and/or reinforced with an exemplary elastomeric tape in accordance with an aspect herein.
Figure 8:
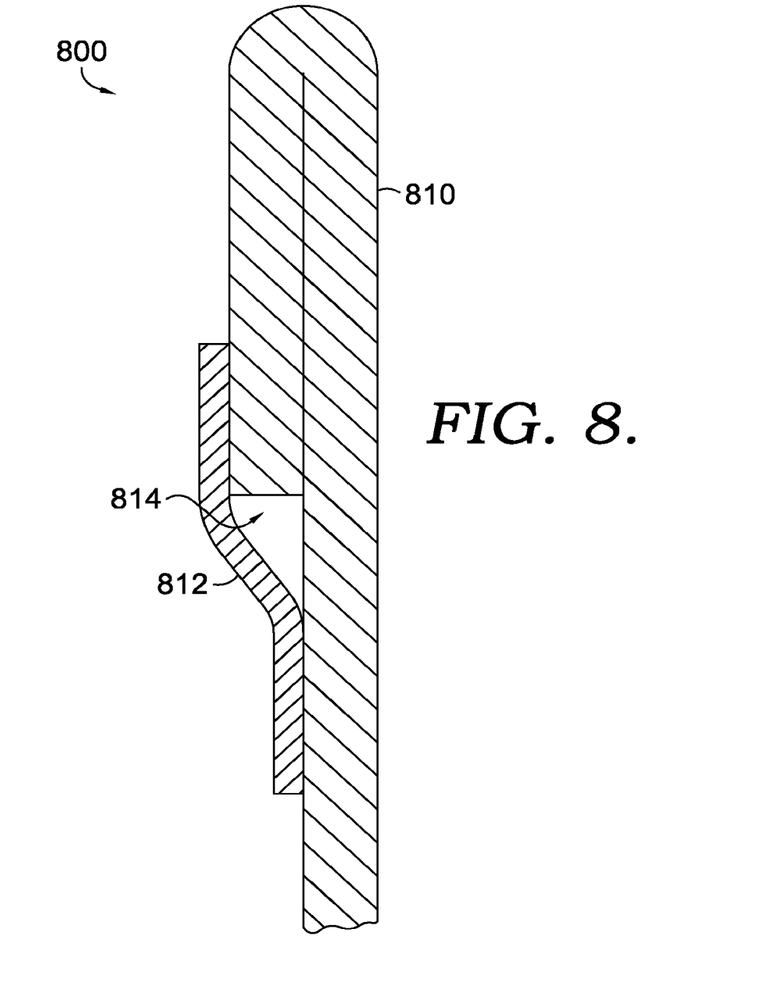
FIG. 8 illustrate an exemplary hem of an article where the hem is bonded and/or reinforced with an exemplary elastomeric tape in accordance with an aspect herein.

FIG. 5B illustrates an exemplary sleeve of the article of apparel 600, where the sleeve has a hem 522 that is bonded and/or reinforced by an elastomeric tape 524 having an exemplary configuration as described herein such as the exemplary configuration of the tape 100. A close-up view of a hem that is bonded and/or reinforced by the exemplary elastomeric tape described herein is shown in FIG. 8 and is referenced generally by the numeral 800. A textile material 810 is shown as being folded over onto itself to form a hem line 814. The hem line 814 may be affixed using an exemplary elastomeric tape 812 as described herein such as the tape 100. In exemplary aspects, the hem 814 may be secured using only the elastomeric tape 812, while in other aspects, the hem 814 may be secured using, for example, stitching, welding, and/or an adhesive and the elastomeric tape 812 may be used to further reinforce the hem 814. The hem 814 may be located on any portion of an article.

Figure 6A:
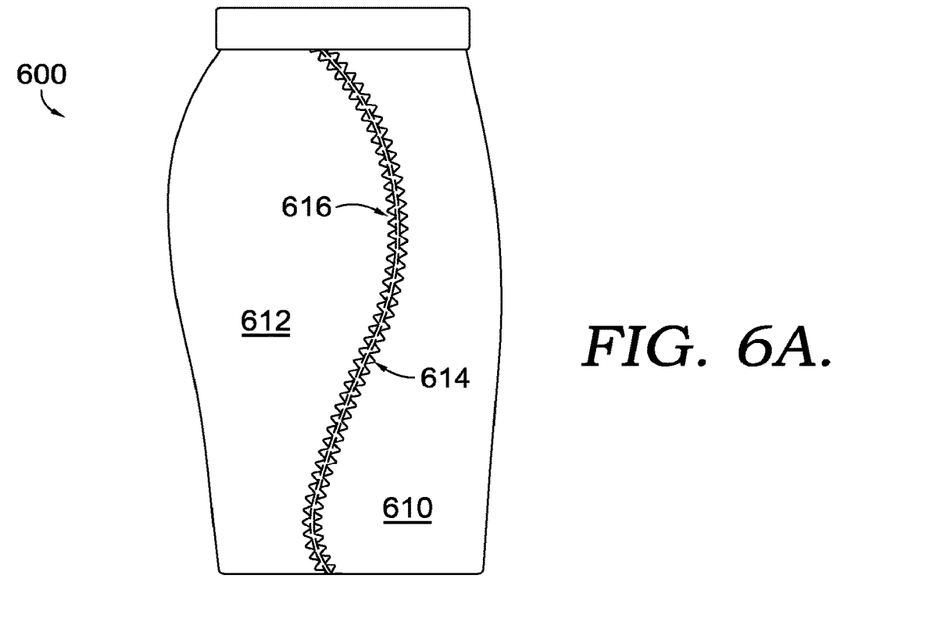
FIGS. 6A-6C illustrates exemplary articles of apparel for a lower torso of a wearer having seams and/or hems bonded and/or reinforced with an exemplary elastomeric tape in accordance with aspects herein.
Figure 6B:
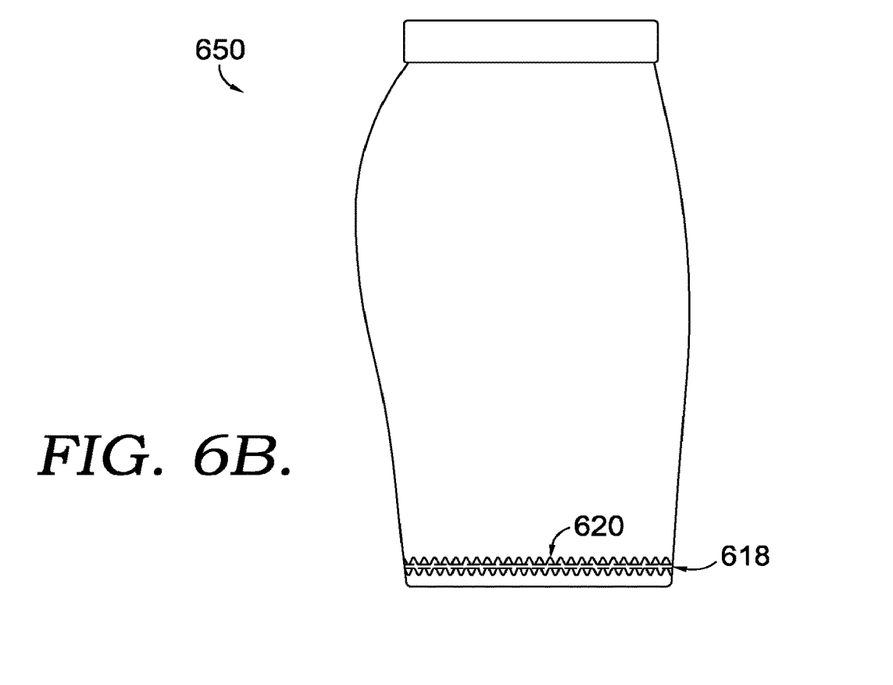
Figure 6C:
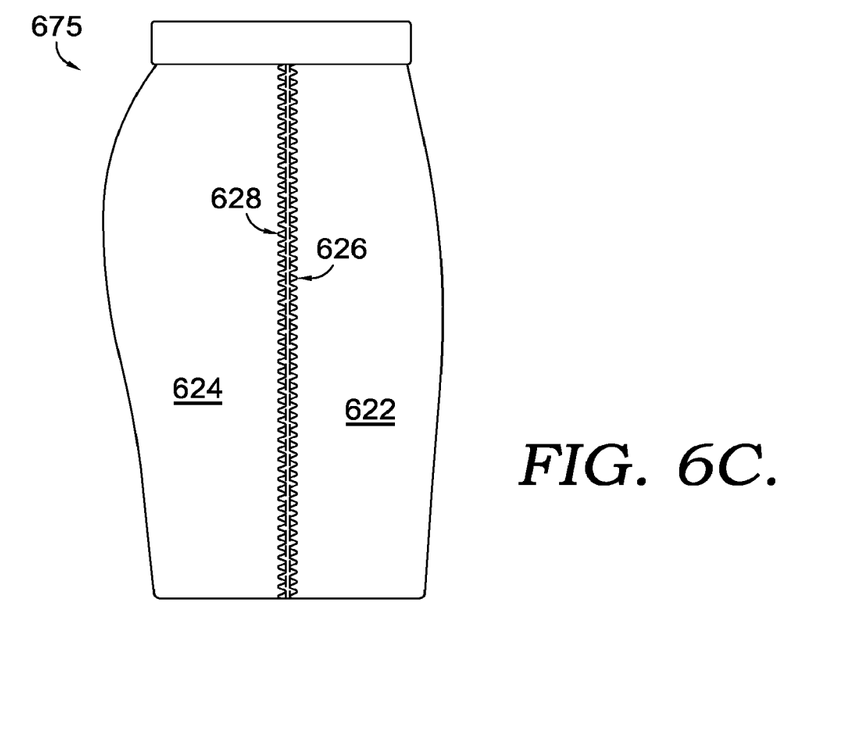

FIGS. 6A-6C illustrate exemplary articles of apparel for a lower torso of a wearer. Referring to FIG. 6A, the article of apparel 600 comprises at least a front panel 610 affixed to a back panel 612 by a curved seam 614. The seam 614 is shown as being bonded or reinforced by an elastomeric tape 616 having an exemplary configuration as described herein such as the exemplary configuration of the tape 100. The shape configuration of the tape 616 enables its surface to be fully adherent to the seam 614 throughout the length of the seam 614. This is because the peaks and troughs of the tape 616 are able to flex such that the tape conforms to the curved shape of the seam 614. Although the tape 616 is shown as being located on the external-facing surface of the apparel item 600 for aesthetic appeal, it is contemplated herein that the tape 616 may be located on the internal-facing surface of the apparel item 600.

Apparel item 650 in FIG. 6B is also in the form of a short having a hem 618 that is bonded and/or reinforced by an exemplary elastomeric tape 620 having the shape configuration described herein such as the shape configuration associated with the tape 100. Although the tape 620 is shown as being located on the external-facing surface of the apparel item 650, it is contemplated herein that the tape 620 may also be located on the inner-facing surface of the apparel item 650.

FIG. 6C illustrates an article of apparel 675 for a lower torso of a wearer, where the article 675 comprises at least a front panel 622 affixed to a back panel 624 by a straight seam 626. The seam 626 is shown as being bonded or reinforced by an exemplary elastomeric tape 628 having an exemplary configuration described herein such as the exemplary configuration of the tape 100. As previously mentioned, the configuration associated with the tape 100 is suited to impart a degree of stretch to seams and or hems regardless of whether the seam and/or hem is straight or curved. Although the tape 628 is shown as being located on the external-facing surface of the apparel item 675 for aesthetic appeal, it is contemplated herein that the tape 628 may be located on the internal-facing surface of the apparel item 675.

Figure 7:
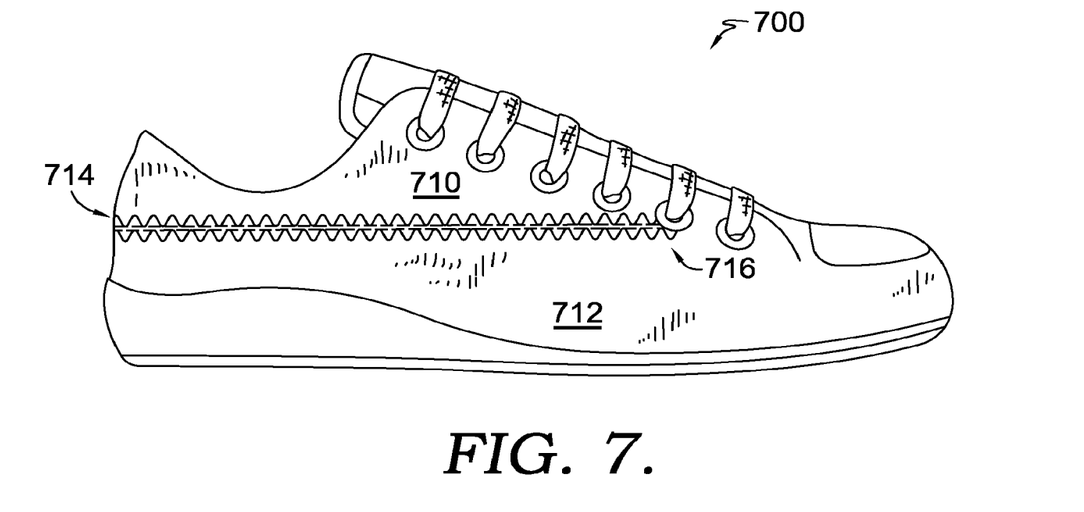
FIG. 7 illustrates an exemplary article in the form of a shoe having a seam bonded and/or reinforced with an exemplary elastomeric tape in accordance with an aspect herein.

FIG. 7 illustrates an article in the form of a shoe 700. The shoe 700 may be in the form of an athletic shoe, a dress shoe, and the like. The shoe 700 comprises at least a first panel 710 affixed to a second end panel 712 by a seam 714. The seam 714 is shown as being bonded or reinforced by an exemplary elastomeric tape 716 having an exemplary configuration described herein such as the exemplary configuration of the tape 100. Although the tape 716 is shown as being located on the external-facing surface of the shoe 700, it is contemplated herein that the tape 716 may be located on the internal-facing surface of the shoe 700. Moreover, with respect to an article in the form of a shoe, such as the shoe 700, the exemplary elastomeric tape described herein may further be utilized as a lace or may be utilized on seams located on different areas of the shoe than that shown in FIG. 7.

The different articles shown in FIGS. 5A-7 are exemplary only. It is contemplated herein that the articles shown in these figures may take different forms such as a long-sleeved shirt, a pull-over, a tank-top, a jacket or coat, a camisole, a swim top, and the like for the article of apparel for an upper torso, and may take the form of a pant, a capri, a half-pant, a three-quarter pant, a tight, and the like for the article of apparel for a lower torso. Further, articles contemplated herein may further include articles such as hats, hoods, socks, gloves, mittens, totes, backpacks, duffle bags, purses, and the like. Any and all such aspects, and any variation thereof, are contemplated as being within the scope herein.

FIGS. 10-16 illustrate exemplary configurations for peaks and troughs associated with exemplary elastomeric tapes described herein such as the tape 100. The variations in widths of the tapes, tolerances of the tapes, peak offsets, trough angles, and distances between adjacent peaks and troughs discussed above with respect to the exemplary tape 100 are equally applicable to the tapes shown in FIGS. 10-16.

Figure 10:
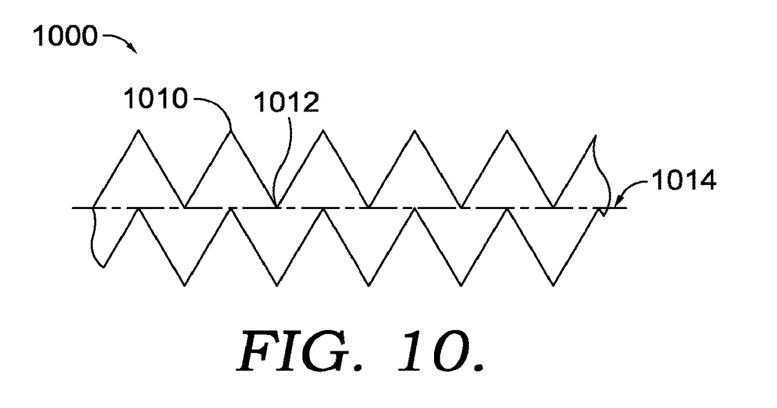
FIGS. 10-16 illustrate exemplary configurations for exemplary elastomeric tapes in accordance with aspects herein.

FIG. 10 illustrates an exemplary elastomeric tape 1000 having a shape configuration where each peak 1010 and each trough 1012 terminates at an apex point. Moreover, as shown in FIG. 10, the tolerance 1014 as measured between a trough 1012 on a first side of the tape 1000 and a trough 1012 on the second side of the tape 1000 may be negligible or even non-existent although it is contemplated herein that the tolerance may comprise one of the values discussed above.

Figure 11:
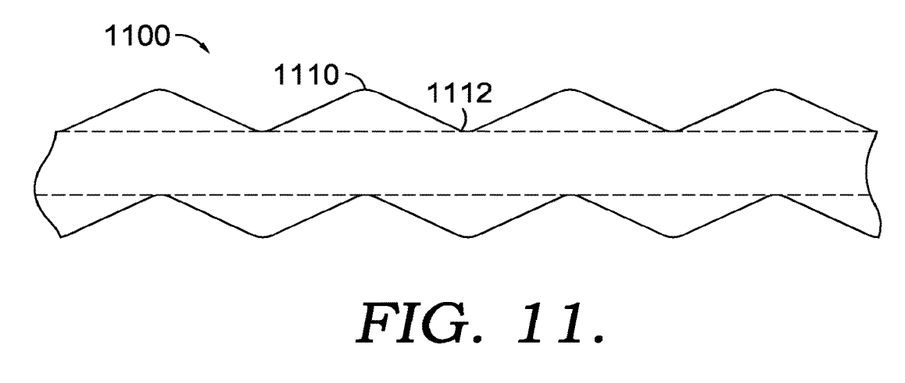
Figure 12:
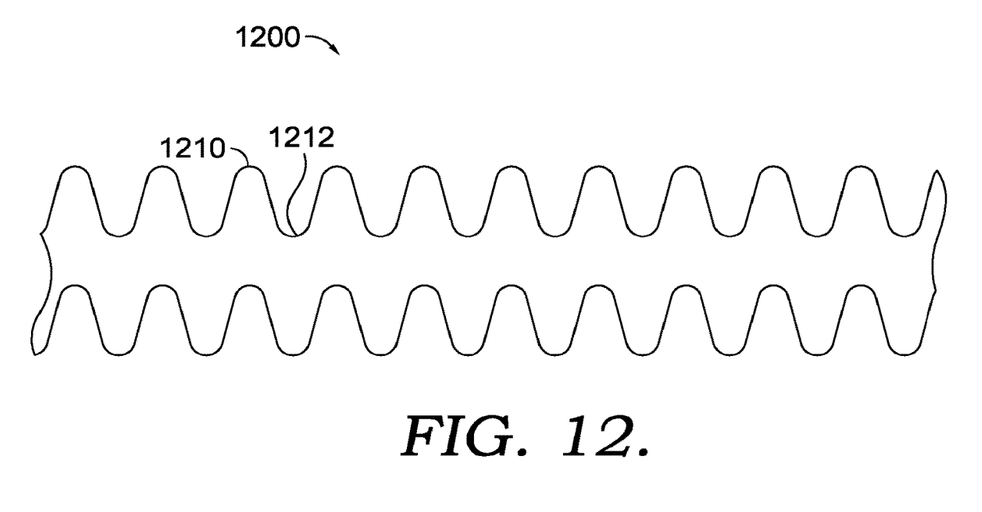

FIG. 11 illustrates an exemplary elastomeric tape 1100 having a shape configuration where the peaks 1110 and the troughs 1112 are flattened out as compared to the tape 100. In other words, the trough angle for the tape 1100 may be greater than the trough angle of other exemplary configurations. FIG. 12 illustrates an exemplary elastomeric tape 1200 having a shape configuration where the peaks 1210 and the troughs 1212 assume an undulating or sinusoidal configuration.

Figure 13:
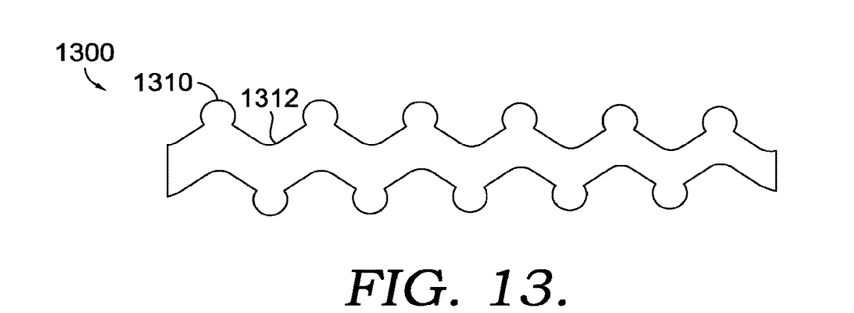

FIG. 13 illustrates an exemplary elastomeric tape 1300 where each peak 1310 terminates in a circular structure. The tape 1300 may have an aesthetic appeal that makes it suitable for use on an external-facing surface of an article while still maintaining its enhanced stretch characteristic.

Figure 14:
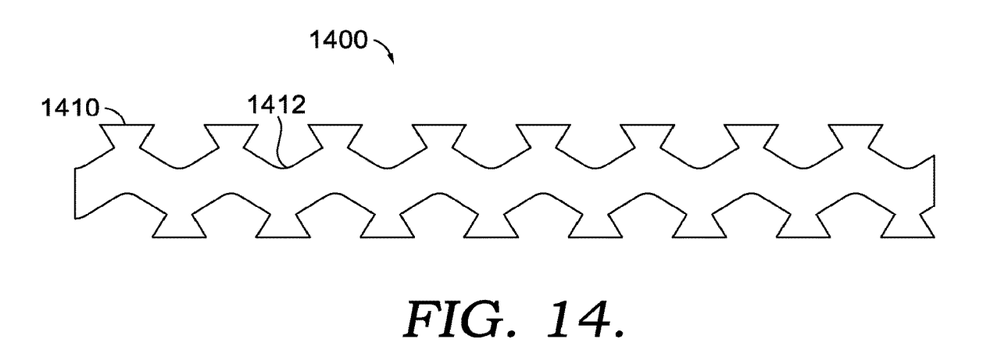

FIG. 14 illustrates an exemplary elastomeric tape 1400 where each peak 1410 terminates in a triangular structure. Similar to the tape 1300, the tape 1400 may have an aesthetic appeal that makes it suitable for use on an external-facing surface of an article while still maintaining its enhanced stretch and/or flexion characteristics.

Figure 15:
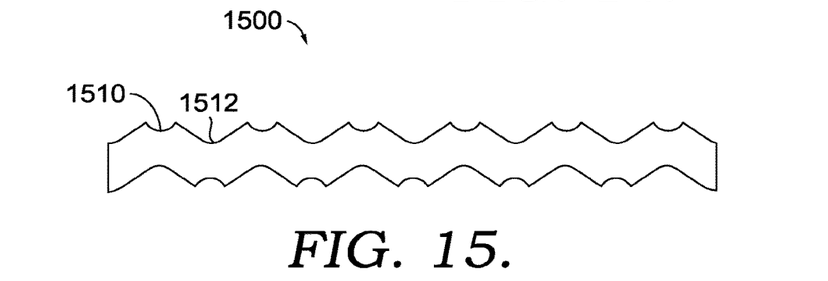
Figure 16:
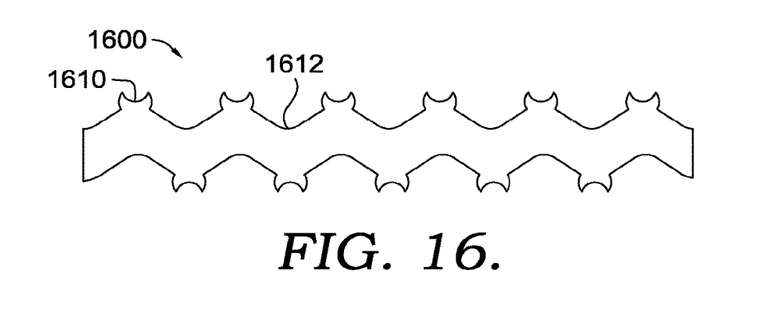

FIG. 15 illustrates an exemplary elastomeric tape 1500 where each peak 1510 is notched. FIG. 16 illustrates an exemplary elastomeric tape 1600 where each peak 1610 has a pair of apex points and each trough 1612 has a configuration similar to that associated with the tape 100. The configurations depicted in FIGS. 10-16 are exemplary only and it is contemplated herein that the apex shapes and the trough shapes may assume a variety of different appearances without departing from the scope described herein.

Figure 9:
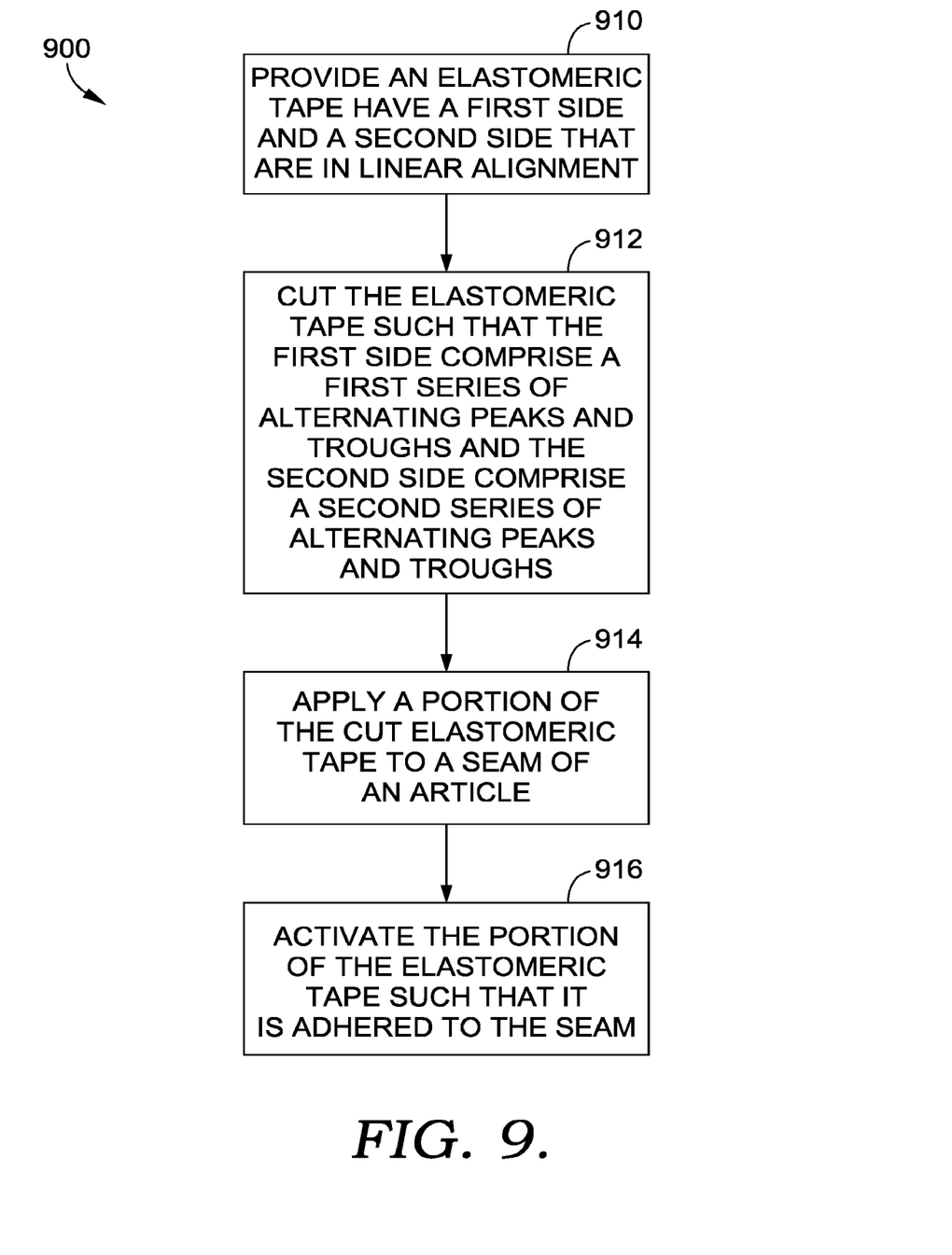
FIG. 9 illustrates a flow diagram of an exemplary method of manufacturing and using an elastomeric tape having enhanced mechanical stretch characteristics in accordance with an aspect herein.

Turning now to FIG. 9, a flow diagram is illustrated of an exemplary method 900 of manufacturing an elastomeric tape having an enhanced stretch characteristic. At a step 910 an elastomeric tape having a traditional configuration is provided where the elastomeric tape comprises a first planar surface, a second planar surface opposite the first surface, a first side, and a second side opposite the first side where the first and second sides are linear and are in parallel alignment with each other.

At a step 912, the elastomeric tape provided in the step 910 is cut such that the first side comprises a series of alternating peaks and troughs and the second side comprises a series of alternating peaks and troughs. In an exemplary aspect, the tape may be cut such that a peak on the first side is aligned across the width of the tape with a trough on the second side, and a trough on the first side is aligned across the width of the tape with a peak on the second side. This configuration is exemplified by the tape 100 of FIGS. 1A and 1B. Cutting may occur via a die-cutter that has two complementary die-cutting wheels. In aspects, cutting may also occur via other processes such as laser cutting, hydro-jet cutting, hand cutting, and the like.

At a step 914, the cut tape, or a portion of the cut tape may be applied to a one or more seams or hems of an article such as the articles shown in FIGS. 5A-7. Prior to application, the cut tape may be re-rolled and fed into a tape dispenser. As such, application of the tape to the seam or hem may occur via the tape dispenser. At a step 916, the tape may be activated to adhere the tape to the seam or hem in order to bond and/or reinforce the seam or hem. Activation may occur via heat, light, ultrasound, mechanical pressure, a chemical process, and the like.

From the foregoing, it will be seen that aspects herein are well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible aspects may be made without departing from the scope thereof, it is to be understood that all matter herein set forth or shown in the accompanying drawings is to be interpreted as illustrative and not in a limiting sense.

What is claimed is:

1. A lower-torso article of apparel comprising:
   a front panel of material forming a front of at least a first leg portion of the lower-torso article of apparel, the front panel of material having at least a first side edge;
   a separate back panel of material forming a back of the first leg portion of the lower-torso article of apparel, the back panel of material having at least a second side edge, wherein the first side edge of the front panel of material abuts the second side edge of the back panel of material to form a side seam located at a lateral aspect of the first leg portion, wherein the first side edge and the second side edge are in a planar relationship with the front panel of material and the back panel of material at the side seam, and wherein the front panel of material and the back panel of material are in a planar relationship with each other at the side seam; and
   an elastomeric tape adhered to an external-facing surface of the front panel of material and the back panel of material at the side seam so as to secure the side seam, wherein the side seam is secured without the use of stitching, and wherein the elastomeric tape includes a first end located at a lower edge of a waistband of the lower-torso article of apparel and a second end located at a leg opening of the first leg portion of the lower-torso article of apparel, the elastomeric tape extending vertically between the first end and the second end, the elastomeric tape having a shape configuration comprising:
   a first surface;
   a second surface opposite the first surface, wherein the second surface is affixed to the front panel of material and the back panel of material at the side seam;
   a first side having a shape configuration comprising a first series of alternating peaks and troughs; and a second side having a shape configuration comprising a second series of alternating peaks and troughs, wherein a first angle between 30 degrees and 60 degrees is formed at an apex region of each trough of the first series of troughs and each trough of the second series of troughs when the elastomeric tape is in a non-stretched state, and a second angle is formed at the apex region of the each trough of the first series of troughs and the each trough of the second series of troughs when the elastomeric tape is in a longitudinally stretched state, the second angle greater than the first angle.

2. The lower-torso article of apparel of claim 1, wherein the side seam is curved, and wherein an entirety of the second surface of the elastomeric tape is adherent to the side seam throughout a length of the side seam.

3. The article of claim 1, wherein the seam is linear, and wherein an entirety of the second surface of the elastomeric tape is adherent to the seam throughout a length of the seam.

4. The lower-torso article of apparel of claim 1, wherein a peak of the second series of peaks on the second side is aligned across a width of the elastomeric tape with a trough of the first series of troughs on the first side, and a trough of the second series of troughs on the second side is aligned across the width of the elastomeric tape with a peak of the first series of peaks on the first side.

5. The lower-torso article of apparel of claim 1, wherein a distance between a first peak of the first series of peaks on the first side and a second, adjacent peak of the first series of peaks on the first side of the elastomeric tape is the same as a distance between a first peak of the second series of peaks on the second side and a second, adjacent peak of the second series of peaks on the second side of the elastomeric tape.

6. The lower-torso article of apparel of claim 1, the elastomeric tape further comprising an adhesive located on the second surface of the elastomeric tape.

7. The lower-torso article of apparel of claim 1, wherein the first series of troughs are spaced apart from a longitudinal axis of the elastomeric tape, and wherein the second series of troughs are spaced apart from the longitudinal axis of the elastomeric tape such that the elastomeric tape comprises a tolerance.

8. The lower-torso article of apparel of claim 1, wherein the apex region of each peak of the first series of peaks and each peak of the second series of peaks consists of a single apex point.

9. The lower-torso article of apparel of claim 8, wherein the apex region of each trough of the first series of troughs and each trough of the second series of troughs consists of a single apex point.

* * * * *

UNITED STATES PATENT AND TRADEMARK OFFICE
CERTIFICATE OF CORRECTION

PATENT NO. : 10,870,778 B2  
APPLICATION NO. : 16/106735  
DATED : December 22, 2020  
INVENTOR(S) : Lindsey V. J. Martin et al.

Page 1 of 1

It is certified that error appears in the above-identified patent and that said Letters Patent is hereby corrected as shown below:

In the Specification  
Column 7, Line 33: Delete "and or" and insert -- and/or --.  
Column 8, Line 41: Delete "and or" and insert -- and/or --.

In the Claims  
Column 11, Line 17, Claim 3: Delete "article" and insert -- lower-torso article of apparel --.

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*